3,243,409
SILICON-CONTAINING POLYOXYMETHYLENES
AND METHOD FOR PREPARING
Walter A. Kornicker and Ludwig Maier, Zurich, Switzerland, assignors to Monsanto Company, a corporation of Delaware
No Drawing. Filed Sept. 10, 1962, Ser. No. 222,642
Claims priority, application Switzerland, Sept. 15, 1961, 10,819/61
10 Claims. (Cl. 260—46.5)

The present invention relates to silicon-containing polyoxymethylenes consisting of following structural units $$[R_2SiO)_n(CH_2O)_m]_p$$

and a process for the preparation thereof. In this formula at lease one R is a hydrocarbon radical and the other can be an oxygen atom, $n$ has the value 1–200, $m$ has the value 3–200 and $p$ represents the degree of polymerization. It is preferred that the average ratio of $m$ to $n$ in the polymers of the invention be at least 3 to 1. R usually will have not more than 18 carbon atoms and preferably not more than 8 carbon atoms.

The novel polymers are obtained by reacting a di- or trifunctional organosilicon derivative with a polyoxymethylene dihydrate. The di- and trifunctional organosilicon derivatives serving as first reaction components correspond, in the simplest case, to the formulae $$R_2SiX_2 \text{ and } RSiX_3$$

wherein R has the significance defined above and X is a functional radical capable of being exchanged, especially a halogen atom, preferably a chlorine atom. Examples for this are mono- and di-methyl, -ethyl, -n-propyl, -isopropyl, -vinyl, -allyl, -trichlormethyl, -trifluormethyl, -$\beta$-trifluoroethyl, -perchlorethyl, -perfluorethyl, -$\beta$-cyanoethyl, -dodecyl, -cyclohexyl, -cyclohexenyl, -cyclohexadienyl, -benzyl, -styryl, -phenyl silicon tri(di respectively) chloride, -bromide, -fluoride etc. The heterocyclically substituted silicon derivatives which are not yet so well known, of course, will also be applicable. It is obvious when two organic radicals are bound to the one silicon atom, these may be different from one another.

Block-copolymers, which are particularly valuable, are obtained by reacting difunctional siloxanes of the formula $$X(R_2SiO)_{n-1}R_2SiX$$

wherein R, X and $n$ are defined as before. These important starting products are accessible by employing methods which are known per se, e.g. partial hydroylsis of organosilicon halides, heating of cyclic siloxanes with organosilicon halides, exchange of OH-groups, standing at the end, for halogen in polymeric siloxanes etc. The siloxane component can also be constituted of trifunctional siloxane units, i.e. be cross-linked.

Dihydrates of oligomeric or polymeric oxymethylenes are used as second reactants. These compounds, also called paraformaldehyde, correspond to the formula $$HO(CH_2O)_mH$$

They are prepared by, for example, evaporation of aqueous solutions of formaldehyde. The degree of polymerization is, in general, small and not greater than about 50. Somewhat higher molecular polyoxymethylenes are obtained with the aid of acidic or basic catalizers. In this case, the degree of polymerization is scarcely greater than about 200. However, paraformaldehydes of uniform molecular weight which had been fractionated in a solvent may also be used, if desired.

To practice the invention, the halosilane or halosiloxane is heated with paraformaldehyde in apppropriate proportion in the presence of a tertiary base. Suitable tertiary bases are, e.g. pyridine, luditine, dimethylaniline, hexahydrodimethylaniline, triethylamine, methylpiperdine, dimethylpiperazine etc. The reaction is expediently carried out in a solvent like dimethylformamide, dimethylsulfoxide, nitrobenzene, dimethylaniline, ketones etc. The endproducts can be purified by precipitating with methanol or ethanol.

Among the products of invention, those consisting of partial blocks of siloxane and of polyoxymethylene in an alternating sequence, possess a special technical importance. The statistic of the distribution of the polyoxymethylene and silicon, or siloxane respectively, chain fragments depend on the stoichiometric ratio and the number of functional groups in the reactants, and also the course of the process. The size of the blocks depends, apart from these factors, also on the degree of polymerization of the starting components.

It is known that the hemi-acetal groups standing at the end of the polyoxymethylene chains facilitate the thermal depolymerization, which occurs with evolution of monomeric formaldehyde. For this reason, it is advantageous to block the hydroxyl groups, still being present after the reaction is complete. This can be effected in a well known way by treatment with agents which cause esterification, etherification etc. of the hydroxyl groups standing at the end. Chain transferring agents useful for this purpose can also be added during the polymerization. Thus, thermally stable end-products can be prepared in one operation. The polymers of invention can also be stabilized by heating them at a definite temperature which will only cause the degradation of the polyoxymethylene blocks standing at the end of the chains. The appropriate temperatures to this purpose lie in the range of about 130–160° C. The heating can even be extended to higher temperatures in a nitrogen atmosphere. The silicon-containing polyoxymethylenes which have been stabilized in this manner then possess at the ends of their chains only silane or siloxane groups. Moreover, they can be further improved by addition of antioxidants, such as phenyl-$\alpha$-naphthylamine etc. and fomaldehyde-binding agents, such as urea, melamine, amides, polyamides etc.

The compounds can also be subjected to curing by sulfur, assuming that unsaturated groups, such as vinyl groups, are present. The suitable content of vinyl groups amounts for this, by way of example, to about 2–5%. Further, the linear polymers can be made cross-linked by organic peroxides, such as bis-(2,4-dichlorobenzoyl) peroxide, dibenzoylperoxide, dicumylperoxide, di-tert.-butylperoxide etc., if necessary under application of pressure, in a manner commonly used for silicones.

According as to their structure, the products of invention are liquid, fat-, wax-, rubber-like or hard substances. They possess to some extent the combined properties of silicones and high-molecular polyoxymethylenes.

*Example 1*

Linkage of paraformaldehyde by dimethylchlorosilane. A mixture consisting of 250 ml. of anhydrous dimethylformamide, 4.8 g. (0.037 mole) of dimethylchlorosilane and 14.8 g. (0.074 mole) of triethylamine is heated at 100° C. in a nitrogen atmosphere. To the stirred mixture are added at once 20.0 g. of paraformaldehyde [average degree of polymerization 16; molecular weight about 500 according to the iodometric determination of formaldehyde by the method of R. Singer, Helvetica Chimica Acta 13, 43 (1930)]. After stirring for 2 hours at 100° C. there are 14.6 g. of unreacted paraformaldehyde centrifuged from the hot solution. A jelly precipitates on cooling the solution to room temperature. Most of the dimethylformamide can be eliminated by centrifuging. The solid residue is dried under high vacuum and the triethylamine chlorohydrate is eliminated by washing twice with methanol. Yield: 7.3 g. of a solid polymeric product; M.P. about 160° C. (slow decomposition).

*Analysis.*—The iodometric determination demonstrates that for each 5 units of formaldehyde a group $(CH_3)_2SiO$ is present.

What is claimed is:

1. A process of preparing silicon-containing polyoxymethylene polymer having selected from the class consisting of units of the following structures $$[RSiO_{3/2n}(CH_2O)_m]_p$$

and $$[R_2SiO)_n(CH_2O)_m]_p$$

wherein R is a monovalent hydrocarbon radical, *n* is an integer of 1–200, *m* is an integer of 3–200, and *p* represents the degree of polymerization, comprising reacting in the presence of a tertiary amine and in the absence of moisture a silicon reactant selected from the class consisting of $R_2SiX_2$, $RSiX_3$ and $X(R_2SiO)_{n-1}R_2SiX$, wherein X is a halogen atom and R and *n* are as defined hereinabove, with a polymeric oxymethylene dihydrate.

2. A process of claim 1 wherein the reaction is carried out in the presence of an inert solvent.

3. A process of claim 1 wherein X is a chlorine atom.

4. A process of claim 1 wherein said silicon reactant is of the formula $R_2SiX_2$ with the R's being alkyl radicals having not more than 8 carbon atoms and the X's being chlorine atoms.

5. A process of claim 1 wherein at least a part of the R radicals have an olefinic bond in the α-position.

6. A process of claim 1 wherein the reaction is carried out in the presence of an inert solvent, and said silicon reactant is of the formula $R_2SiX_2$ with the R's being alkyl radicals having not more than 8 carbon atoms and the X's being chlorine atoms.

7. A silicon-containing polyoxymethylene polymer having selected from the class consisting of units of the following structures $$[(RSiO_{3/2})_n(CH_2O)_m]_p$$

and $$[R_2SiO)_n(CH_2O)_m]_p$$

wherein R is a monovalent hydrocarbon radical, *n* is an integer of 1–200, *m* is an integer of 3–200, provided the average ratio of *m* to *n* in the polymer is at least 3 to 1, and *p* represents the degree of polymerization.

8. A polymer of claim 7 wherein the R's are alkyl radicals having not more than 8 carbon atoms.

9. A polymer of claim 7 wherein the R's are methyl radicals.

10. A polymer of claim 7 wherein *n* and *m* each have at least the value of 10.

References Cited by the Examiner

UNITED STATES PATENTS

| | | | |
|---|---|---|---|
| 2,386,793 | 10/1945 | Hanford | 260—448.8 |
| 2,842,522 | 7/1958 | Freye | 260—46.5 |
| 2,993,871 | 7/1961 | Shannon et al. | 260—46.5 |
| 3,078,293 | 2/1963 | Ender | 260—448.8 |
| 3,081,269 | 3/1963 | Shannon et al. | 260—448.8 |
| 3,109,854 | 11/1963 | Ender | 260—448.2 |

LEON J. BERCOVITZ, *Primary Examiner.*

WILLIAM H. SHORT, MURRAY TILLMAN,
*Examiners.*